United States Patent
Kowada

(10) Patent No.: US 9,541,335 B2
(45) Date of Patent: Jan. 10, 2017

(54) COOLING WATER CIRCULATION DEVICE

(71) Applicant: HINO MOTORS, LTD., Tokyo (JP)

(72) Inventor: Minoru Kowada, Tokyo (JP)

(73) Assignee: HINO MOTORS, LTD., Tokyo (JP)

( * ) Notice: Subject to any disclaimer, the term of this patent is extended or adjusted under 35 U.S.C. 154(b) by 112 days.

(21) Appl. No.: 14/405,577

(22) PCT Filed: Jun. 21, 2013

(86) PCT No.: PCT/JP2013/003901
§ 371 (c)(1),
(2) Date: Dec. 4, 2014

(87) PCT Pub. No.: WO2014/002459
PCT Pub. Date: Jan. 3, 2014

(65) Prior Publication Data
US 2015/0144305 A1    May 28, 2015

(30) Foreign Application Priority Data

Jun. 26, 2012    (JP) .................... 2012-142625

(51) Int. Cl.
*F28D 15/00* (2006.01)
*F01P 11/04* (2006.01)
(Continued)

(52) U.S. Cl.
CPC .............. *F28D 15/00* (2013.01); *F01N 3/2066* (2013.01); *F01P 3/20* (2013.01); *F01P 11/04* (2013.01);
(Continued)

(58) Field of Classification Search
CPC ................ F28D 15/00; F01P 3/12; F01P 3/20; F01P 11/04; F01P 2060/16; F01N 3/208; F01N 2590/08; F01N 2260/024; F01N 2610/02; F01N 2610/11; Y02T 10/24
(Continued)

(56) References Cited

U.S. PATENT DOCUMENTS 8,122,710 B2 * 2/2012 Schmale ................. F01N 3/043
60/286
8,241,598 B2 * 8/2012 Frederiksen .......... F01N 3/2066
165/104.19

(Continued)

FOREIGN PATENT DOCUMENTS

JP    2003 328755    11/2003
JP    2004 44482    2/2004
(Continued)

OTHER PUBLICATIONS

International Search Report Issued Aug. 6, 2013 in PCT/JP13/003901 Filed Jun. 21, 2013.

*Primary Examiner* — Grant Moubry
(74) *Attorney, Agent, or Firm* — Oblon, McClelland, Maier & Neustadt, L.L.P.

(57) ABSTRACT

In a cooling water circulation device for use in a $NO_x$ reduction system where a urea injector 3 is positioned higher than an engine 1, a three-way branching device 10 is arranged at a highest position in a passage of passing cooling water 2 from the engine 1 to the urea injector 3 and returning the same to the engine 1 to add an upward air vent 10a. The air vent 10a is connected through an air-venting connecting pipe 11 to a header tank 9 (water pouring tank) for the cooling water 2 arranged higher than the urea injector 3.

4 Claims, 1 Drawing Sheet

(51) Int. Cl.
*F01P 3/20* (2006.01)
*F01N 3/20* (2006.01)

(52) U.S. Cl.
CPC ...... *F01N 2260/024* (2013.01); *F01N 2590/08* (2013.01); *F01N 2610/02* (2013.01); *F01N 2610/11* (2013.01); *F01P 2060/16* (2013.01); *Y02T 10/24* (2013.01)

(58) Field of Classification Search
USPC ............ 123/41.01, 41.31, 41.44; 165/104.19
See application file for complete search history.

(56) References Cited

U.S. PATENT DOCUMENTS

| | | | |
|---|---|---|---|
| 8,740,113 B2* | 6/2014 | Roessle | F01N 3/2066 239/585.1 |
| 2011/0061833 A1 | 3/2011 | Kihara et al. | |

FOREIGN PATENT DOCUMENTS

| | | | | |
|---|---|---|---|---|
| JP | 2004 44483 | 2/2004 | | |
| JP | 2009 270485 | 11/2009 | | |
| JP | 2010 90788 | 4/2010 | | |
| JP | 2012 7511 | 1/2012 | | |
| JP | 2012007511 A | * | 1/2012 | ............... F01N 3/08 |

\* cited by examiner

COOLING WATER CIRCULATION DEVICE

TECHNICAL FIELD

The present invention relates to a cooling water circulation device for a $NO_x$ reduction system.

BACKGROUND ART

Conventionally, in some diesel engines, a selective reduction catalyst having a property of selectively reacting $NO_x$ (nitrogen oxides) with ammonia even in the presence of oxygen is incorporated in an exhaust pipe for flow of exhaust gas. A required amount of urea water is added upstream of the reduction catalyst to pyrolyze the urea water into ammonia and carbon dioxide according to the following formula. The ammonia is reacted as a reducing agent with $NO_x$ in the exhaust gas on the selective reduction catalyst to thereby reduce a concentration of $NO_x$ discharged.

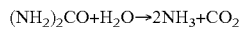

$$(NH_2)_2CO+H_2O \rightarrow 2NH_3+CO_2$$

For the addition of the urea water into the exhaust gas upstream of the selective reduction catalyst, a urea injector is arranged at the exhaust pipe through which the high-temperature exhaust gas flows. The urea injector is exposed to the hot environment and requires to be water-cooled so as not to be seized, so that part of the cooling water 2 cooling the engine 1 is passed to the urea injector 3 and is returned to the engine 1 as shown in FIG. 1.

The cooling water 2 from the engine 1 is branched through a three-way branching device 4 on an entry side of the urea injector 3 so that it is also adapted to be passed via a cooling-water shutoff valve 5 to a urea-water pump 6 and a urea-water tank 7, the cooling water 2 passed thereto being joined at a three-way branching device 8 with the cooling water 2 passed to the urea injector 3 and returned to the engine 1. The urea water freezing in the urea-water pump 6 and the urea-water tank 7, for example, at midwinter may be unfrozen by the cooling water 2 passed to the pump 6 and the tank 7 through opening the cooling-water shutoff valve 5. In the figure, reference numeral 9 denotes a header tank to which the cooling water 2 is poured at a highest position so as to make all of water-cooled systems including the engine 1, a radiator and the like filled with the cooling water.

A conventional art reference for this kind of cooling water circulation device is, for example, the following Patent Literature 1.

CITATION LIST

Patent Literature

[Patent Literature 1] JP 2012-007511A

SUMMARY OF INVENTION

Technical Problems

Application of the $NO_x$ reduction system using the selective reduction catalyst as mentioned in the above not only to a vehicle but also to a hydraulic shovel or other construction machine has been studied. However, in the application to the construction machine, a muffler for accommodation of the selective reduction catalyst has to be arranged at a high position behind the engine 1 for layout restrictions, naturally resulting in arrangement of the urea injector 3 also at a high position, which may deteriorate air releasability in the passage of passing the cooling water 2 to the urea injector 3 and may adversely affect water-cooling performance to the urea injector 3 due to any air pools generated in the passage.

Specifically, in the application of the $NO_x$ reduction system to the truck or other vehicle, respective components may be arranged along frames to attain a layout with less difference in height, so that air releasability in the passage of the cooling water 2 becomes no problem up to the present. However, in application to a construction machine, a layout with less difference in height is difficult to attain unlike the application to a vehicle. Thus, it is feared that the urea injector 3 arranged higher than the engine 1 increases difference in height, leading to liability of any air pools in the passage.

The invention was made in view of the above and has its object to make it possible to keep satisfactory air releasability in a passage of passing cooling water from an engine to a urea injector even if the urea injector is arranged higher than the engine.

Solution to Problems

The invention is directed to a cooling water circulation device used in a $NO_x$ reduction system with a urea injector arranged higher than an engine, comprising a first three-way branching device arranged at a highest position on a passage of passing cooling water from the engine to the urea injector and returning the same to said engine, thereby adding a first upward air vent, said first air vent being connected through an air-venting connecting pipe to a water pouring tank for the cooling water arranged at a position higher than that of said urea injector.

In this manner, upon cooling of the urea injector by the cooling water from the engine, any air in the passage of passing the cooling water from the engine to the urea injector is gathered to the first three-way branching device and is discharged to the first air vent from which the gathered air is withdrawn via the air-venting connecting pipe into the water pouring tank where air-water separation is made for air bleeding.

Further, it is preferable in the invention that there is provided a passage of passing the cooling water from the engine via a cooling-water shutoff valve to a urea-water pump and a urea-water tank and returning the same to said engine, a first half in said passage from the engine to the urea water tank being made to have a highest position in said first half on an entry side of the cooling-water shutoff valve, a second three-way branching device being arranged at said highest position in the first half to thereby add a second upward air vent, a second half in said passage from said urea-water tank to said engine being made to have a highest position halfway in said second half, a third three-way branching device being arranged at said highest position in the second half to thereby add a third upward air vent, the cooling water from said second air vent being passed via said urea injector to said third air vent.

In this manner, upon unfreezing of the urea-water pump and the urea-water tank by the cooling water from the engine through opening the cooling-water shutoff valve, any air in the first half from the engine to the urea-water tank is gathered to the second three-way branching device and is discharged to the second air vent from which the gather air is withdrawn through the urea injector, the first three-way branching device and the air-venting connecting pipe into the water pouring tank. Any air in the second half from the urea-water tank back to said engine is gathered to the third three-way branching device and discharged to the third air vent from which the gathered air is withdrawn through the first three-way branching device and the air-venting connecting pipe into the water pouring tank. As a result, with respect to any air withdrawn from said first and second halves into the water pouring tank, air-water separation is made for air bleeding.

Further, it is preferable in the invention that an inlet and an outlet of the cooling water to and from the urea injector have difference in height such that the cooling water is introduced low and is discharged high, which enhances air releasability in the passage of the cooling water to the urea injector and makes air pools hardly liable to be generated in the urea injector.

Advantageous Effects of Invention

According to the above-mentioned cooling water circulation device of the invention, various excellent effects can be exhibited as follows.

(I) Even if the urea injector is arranged higher than the engine, air in the passage of passing the cooling water from the engine to the urea injector is gathered to the first three-way branching device and is discharged to the first air vent from which the gathered air is withdrawn through the air-venting connecting pipe into the water pouring tank for air bleeding. As a result, air releasability in the passage of passing the cooling water to the urea injector can be kept satisfactory, and prevented beforehand is fear of the water-cooling performance to the urea injector being adversely affected by any air pools generated in the passage.

(II) Construction may be made such that the passage is provided for passing the cooling water from the engine to the urea-water pump and the urea-water tank via the cooling-water shutoff valve and returning the same to the engine, that the first half in the passage from the engine to the urea-water tank is made to have the highest position on the entry side of the cooling-water shutoff valve in the first half and a second three-way branching device is arranged at the highest position in the first half, thereby adding the second upward air vent and that the second half from the urea-water tank back to the engine is made to have a highest position halfway in the second half and a third three-way branching device is arranged at the highest position in the second half to thereby add the third upward air vent, the cooling water from the second air vent being passed via the urea injector to the third air vent. Then, upon unfreezing of the urea-water pump and the urea-water tank by the cooling water from the engine through opening the cooling-water shutoff valve, both in the first and second halves of the passage of passing the cooling water from the engine to the urea-water pump and the urea-water tank, air can be gathered to the second and third three-way branching devices and discharged to the second and third air vents from which the air is withdrawn through the air-venting connecting pipe into the water pouring tank for air bleeding. As a result, air releasability in the passage of passing the cooling water to the urea-water pump and the urea-water tank can be kept satisfactory, and prevented beforehand is fear of the unfreezing performance to the urea-water pump and the urea-water tank being adversely affected by any air pools generated in the passage.

(III) Construction can be made to have an input and an output of the cooling water to and from the urea injector with difference in height such that the cooling water is introduced low and is discharged high, which can enhance air releasability in the passage of the cooling water to the urea injector and make air pools hardly liable to be generated in the urea injector. As a result, fear of the water-cooling performance to the urea injector being adversely affected by any air pools can be further reliably prevented.

DESCRIPTION OF EMBODIMENT

Figure 1:
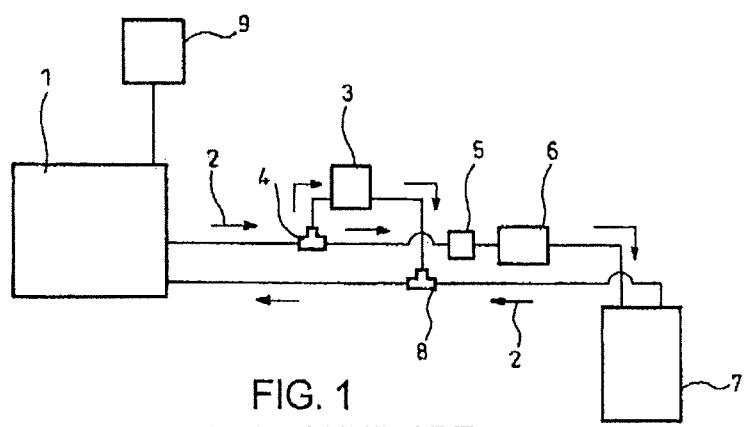
FIG. 1 is a schematic view showing the conventional art.

Next, an embodiment of the invention will be described in conjunction with the drawing.

Figure 2:
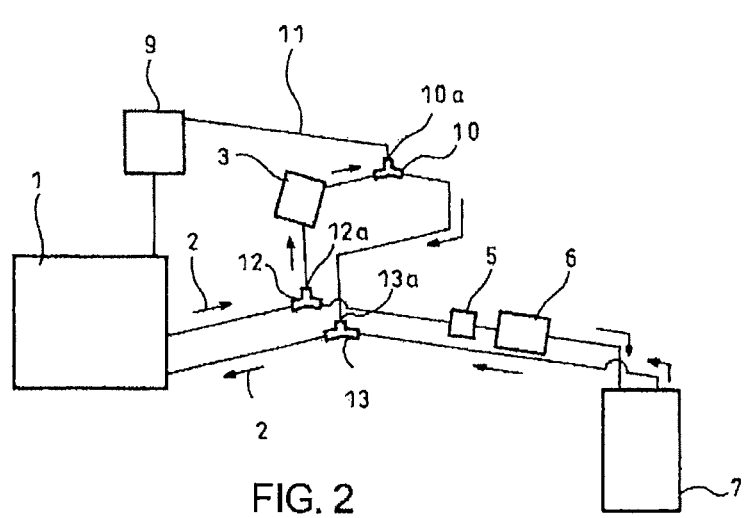
FIG. 2 is a schematic view showing an embodiment of the invention.

FIG. 2 shows the embodiment of the invention in which parts identical with those in FIG. 1 are presented by the same reference numerals.

As shown in FIG. 2, the embodiment is applied to a $NO_x$ reduction system where a urea injector 3 for addition of urea water as reducing agent is arranged upstream of a selective reduction catalyst incorporated in an exhaust pipe (not shown) and arranged higher than an engine 1. Just like the conventional art illustrated in FIG. 1, part of cooling water 2 cooling the engine 1 is passed to the urea injector 3 and is returned to the engine 1 while the cooling water 2 from the engine 1 is also adapted to be passed through a cooling-water shutoff valve 5 to a urea-water pump 6 and a urea-water tank 7.

In this regard, a three-way branching device 10 is arranged at a highest position in a passage of passing the cooling water 2 from the engine 1 to the urea injector 3 and returning the same to the engine 1, thereby adding an upward air vent 10a. The air vent 10a is connected through an air-venting connecting pipe 11 to a header tank 9 arranged higher than the urea injector 3.

Exemplarily illustrated in the embodiment is the header tank 9 as water pouring tank connected to the air vent 10a through the air-venting connecting pipe 11. If a radiator header (not shown) is arranged higher than the urea injector 3, alternatively the radiator header may be connected as water pouring tank to the air vent 10a through the air-venting connecting pipe 11.

Further, in the passage of passing the cooling water 2 from the engine 1 to the urea-water pump 6 and urea-water tank 7 via the cooling-water shutoff valve 5 and returning the same to the engine 1, a first half from the engine 1 to the urea-water tank 7 has a highest position on an entry side of the cooling-water shutoff valve 5, and a three-way branching device 12 is arranged at the highest position in the first half to thereby add an upward air vent 12a; a second half from the urea-water tank 7 to the engine 1 has a highest position halfway in the second half, and a three-way branching device 13 is arranged at the highest position in the second half to thereby add an upward air vent 13a, the cooling water 2 from the air vent 12a being passed via the urea injector 3 back to the air vent 13a.

Though an existing urea injector 3 has an inlet and an outlet of the cooling water 2 arranged substantially horizontally side by side such that the cooling water 2 is introduced from the inlet, passed through the passage of the cooling water 2 to the urea injector 3 and discharged to the outlet with the same height, the embodiment has a construction with the inlet and the outlet of the cooling water 2 to and from the urea injector 3 having difference in height such that the cooling water 2 is introduced low and is discharged high.

Thus, in this manner, upon cooling of the urea injector 3 by the cooling water 2 from the engine 1, air in the passage of passing the cooling water 2 from the engine 1 to the urea injector 3 is gathered to the three-way branching device 10 and is discharged to the air vent 10a from which the air is withdrawn through the air-venting connecting pipe 11 into the header tank 9 where air-water separation is made for air bleeding. In this case, the inlet and the outlet of the cooling water 2 to and from the urea injector 3 have difference in height such that the cooling water 2 is introduced low and is discharged high, which enhances air releasability in the passage of the cooling water 2 to the urea injector 3.

Moreover, upon unfreezing of the urea-water pump 6 and the urea-water tank 7 by the cooling water 2 from the engine 1 through opening the cooling-water shutoff valve 5, air in the first half from the engine 1 to the urea-water tank 7 is gathered to the three-way branching device 12 and discharged to the air vent 12a from which the air is withdrawn through the urea injector 3, the three-way branching device 10 and the air-venting connecting pipe 11 into the header tank 9; air in the second half from the urea-water tank 7 to the engine 1 is gathered to the three-way branching device 13 and discharged to the air vent 13a from which the air is withdrawn through the three-way branching device 10, the air-venting connecting pipe 11 into the header tank 9. As a result, with respect to the air withdrawn from both of the first and second halves into the header tank 9, air-water separation is made for air bleeding.

Thus, according to the above embodiment, even if the urea injector 3 is arranged higher than the engine 1, air in the passage of passing the cooling water 2 from the engine 1 to the urea injector 3 is gathered to the three-way branching device 10 and is discharged to the air vent 10a from which the gathered air is withdrawn through the air-venting connecting pipe 11 into the header tank 9 for air bleeding. As a result, air releasability in the passage of passing the cooling water 2 to the urea injector 3 can be kept satisfactory, and prevented beforehand is fear of water-cooling performance to the urea injector 3 being adversely affected by any air pools generated in the passage.

Especially in the embodiment, the inlet and outlet of the cooling water 2 to and from the urea injector have difference in height such that the cooling water 2 is introduced low and is discharged high, which can enhance air releasability in the passage of the cooling water 2 to the urea injector 3 and make any air pools hardly liable to be generated in the urea injector 3. As a result, further reliably prevented is fear of the water-cooling performance to the urea injector 3 being adversely affected by the air pools.

Moreover, upon unfreezing of the urea-water pump 6 and the urea-water tank 7 by the cooling water 2 from the engine 1 by opening the cooling-water shutoff valve 5, in the first and second halves in the passage of passing the cooling water 2 from the engine 1 to the urea-water pump 6 and the urea-water tank 7, the air is gathered to the three-way branching devices 12 and 13 and is discharged to the air vents 12a and 13a from which the gathered air is withdrawn through the air-venting connecting pipe 11 to the header tank 9 for air bleeding. As a result, air releasability in the passage of passing the cooling water 2 to the urea-water pump 6 and the urea-water tank 7 can be kept satisfactory, and prevented beforehand is fear of the unfreezing performance to the urea-water pump 6 and urea-water tank 7 being adversely affected by air pool generated in the passage.

It is to be understood that a cooling water circulation device according to the invention is not limited to the above embodiment and that various changes and modifications may be made without departing from the scope of the invention. For example, application is not always restricted to a construction machine.

REFERENCE SIGNS LIST 1 engine
2 cooling water
3 urea injector
5 cooling-water shutoff valve
6 urea-water pump
7 urea-water tank
9 header tank (water pouring tank)
10 three-way branching device (first three-way branching device)
10a air vent (first air vent)
11 air-venting connecting pipe
12 three-way branching device (second three-way branching device)
12a air vent (second air vent)
13 three-way branching device (third three-way branching device)
13a air vent (third air vent)

The invention claimed is:

1. A cooling water circulation device used in a $NO_x$ reduction system with a urea injector arranged higher than an engine, comprising:
a first three-way branching device arranged at a highest position on a passage of passing cooling water from the engine to the urea injector and returning the cooling water to said engine, thereby adding a first upward air vent, said first air vent being connected through an air-venting connecting pipe to a water pouring tank for the cooling water, said water pouring tank arranged at a position higher than a position of said urea injector.

2. The cooling water circulation device as claimed in claim 1, wherein there is provided a passage to pass the cooling water from the engine via a cooling-water shutoff valve to a urea-water pump and a urea-water tank and returning the cooling water to said engine, a first half in said passage from the engine to the urea water tank being made to have a highest position in said first half on an entry side of the cooling-water shutoff valve, a second three-way branching device being arranged at said highest position in the first half to thereby add a second upward air vent, a second half in said passage from said urea-water tank to said engine being made to have a highest position halfway in said second half, a third three-way branching device being arranged at said highest position in the second half to thereby add a third upward air vent, the cooling water from said second air vent being passed through said urea injector back to said third air vent.

3. The cooling water circulation device as claimed in claim 1, wherein an inlet and an outlet of the cooling water to and from the urea injector have difference in height such that the cooling water is introduced low and is discharged high.

4. The cooling water circulation device as claimed in claim 2, wherein an inlet and an outlet of the cooling water to and from the urea injector have difference in height such that the cooling water is introduced low and is discharged high.

* * * * *